Dec. 1, 1964  R. NEUSCHOTZ  3,159,842
METHOD OF FORMING A SELF-TAPPING THREADED ELEMENT
Original Filed April 14, 1959
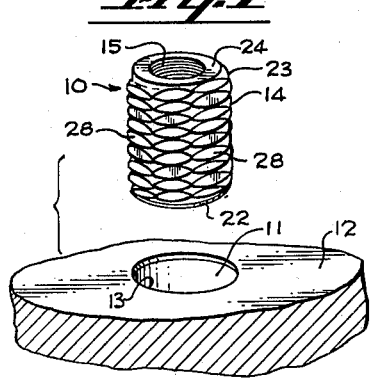
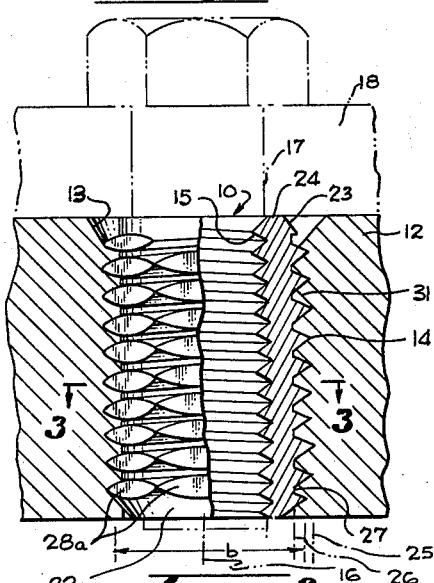
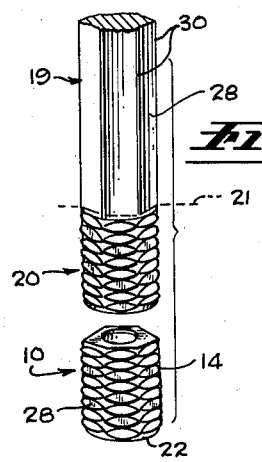
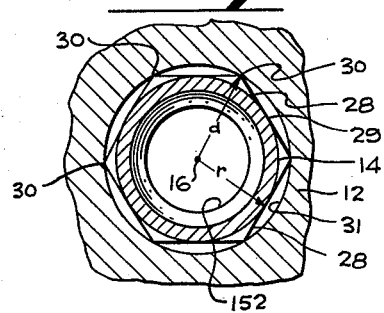
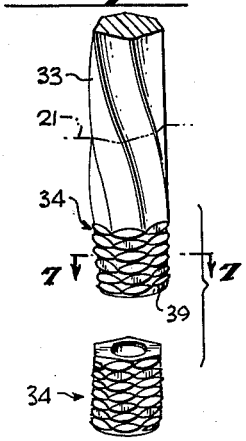
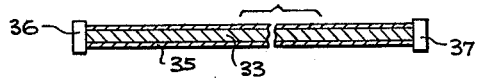
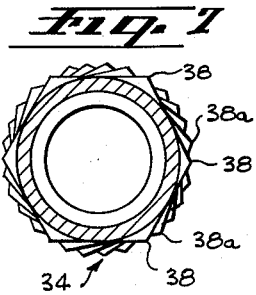
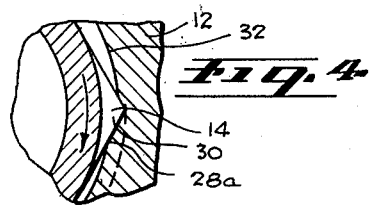
INVENTOR.
ROBERT NEUSCHOTZ
BY
William P. Green
ATTORNEY United States Patent Office 3,159,842
Patented Dec. 1, 1964

3,159,842
METHOD OF FORMING A SELF-TAPPING
THREADED ELEMENT
Robert Neuschotz, 1162 Angelo Drive,
Beverly Hills, Calif.
Original application Apr. 14, 1959, Ser. No. 806,371. Divided and this application Apr. 11, 1960, Serial No. 25,169
3 Claims. (Cl. 10—10)

This invention relates to improved methods of forming threaded elements of the type adapted to tap threads in an initially unthreaded bore. The invention is in certain respects particularly applicable to the formation of self-tapping threaded inserts to be used for attaching a stud or bolt to a carrier part into which the insert is to be screwed.

A major object of the invention is to provide an extremely simple and inexpensive method by which a self-tapping element of this character can be formed. At the same time, it is an object of the invention to so form the threaded element that its self-tapping action will actually be superior in many respects to conventional elements designed for the same purpose. In particular, a part constructed in accordance with the invention is designed so that the threads tapped by it are formed by a unique cold working action, in which the material being threaded is actually deformed or cold worked to the desired thread shape, rather than being cut, with the result that the threads have the increased strength which inherently results from such cold working.

To manufacture a device of the present type, I start with an elongated piece of stock which is non-circular in transverse cross-section, and preferably has the sectional configuration of a regular polygon. In many instances, conventional externally hexagonal bar stock is preferable for this purpose. During the manufacturing process, a series of the desired self-tapping elements are formed from the non-circular stock by a process which includes threading the exterior of the stock, preferably also threading the interior, and cutting off the threaded stock in short sections to form the self-tapping elements. The external configuration formed on the elements by such application of threads to a polygonal piece of stock is such as to form threads which are truncated by the flat sides of the polygonal cross-section stock, in a manner forming a series of circularly spaced radially outwardly extending projections or peaks at different locations about the periphery of the part, which projections act to form the desired threads as the part is screwed into an unthreaded bore. The truncated portions of the threads located circularly between these projections form camming or wedging surfaces advancing radially outwardly toward the projections, to progressively effect the discussed thread forming action as the projections advance through the material of a part being threaded.

It has been found that the projections formed on the insert in this manner have the effect of embedding themselves within the material of the tapped part in a manner very positively locking the insert element against unscrewing rotary movement relative to that part, so that there is no necessity for the provision of additional locking keys or other members for attaining such a locking action. In one form of the invention, the externally polygonal bar stock is initially twisted, prior to the threading operation, so that the circularly spaced projections formed by any one particular turn of the external threads are not axially aligned with the corresponding projections formed on others of the threads, with resultant increased resistance being offered to axial withdrawal of the insert element from a part into which it has been screwed.

The above and other features and objects of the present invention will be better understood from the following detailed description of the typical embodiments illustrated in the accompanying drawing in which:

FIG. 1 is a perspective view representing a self-tapping threaded insert constructed in accordance with the invention, and showing a part into which the insert is to be screwed;

FIG. 2 is an enlarged partially sectional view showing the insert of FIG. 1 as it appears after being screwed into the outer carrier part;

FIG. 3 is a transverse section taken on line 3—3 of FIG. 2;

FIG. 4 is an enlarged fragmentary section showing one of the projections of the insert;

FIG. 5 is a view representing the method of manufacture of the insert shown in FIGS. 1 through 4;

FIG. 6 shows a method of manufacturing a variational form of insert embodying the invention;

FIG. 7 is an enlarged transverse section taken on line 7—7 of FIG. 6; and

FIG. 8 is a view further representing the method of manufacture of the insert shown in FIGS. 6 and 7.

Referring first to FIG. 1, I have shown at 10 a self-tapping thread insert which is to be screwed into an initially unthreaded cylindrical bore 11 formed in a carrier part 12. Part 12 may typically be formed of aluminum or another metal, or in some cases of a resinous plastic material. The bore 11 may have at its upper end a short frusto-conical counter sink portion 13.

Insert 10 is essentially tubular in configuration, and has external threads 14 formed along its outer surface for tapping threads into bore 11 as part 10 is screwed thereinto. The exact configuration of threads 14 will be discussed in detail at a later point. Internally, insert 10 has threads 15, which are centered about the same axis 16 as are external threads 14, and into which a coacting externally threaded stud or bolt 17 is to be connected when the insert is in use. This bolt 17 may typically be utilized for holding a part 18 in position against the upper surface of carrier part 12, as is represented in FIG. 2.

Referring now to FIG. 5, inserts of the type shown in FIGS. 1 to 3 are formed very rapidly and simply from an elongated strip of conventional metal bar stock 19, of a type whose cross-section desirably takes the shape of a regular polygon. In the figures, I have typically represented an instance in which the bar stock 19 is of hexagonal cross-section, though it will be apparent that the cross-section may instead be that of an octagon, a square, or any other convenient polygonal shape. It also might be possible to employ stock having a somewhat different cross-section which forms a geometric figure similar to a polygon, but with the various sides of that figure being curved instead of straight lines. However, it is felt that the best arrangement is one in which the cross-sectional configuration is actually a true regular polygon, or substantially so. It will of course also be understood that the cross-sectional shape of the bar stock 19 should be uniform along the entire length of that stock, though the stock may if desired be given a twisted configuration as will be discussed in greater detail in connection with FIGS. 6 through 8.

Starting with the polygonal stock 19 of FIG. 5, the first step in the manufacturing process may be to form the threads 14 on an end portion 20 of the bar stock, which portion corresponds in length to one of the inserts 10. This end portion 20 is ultimately cut off from the rest of the bar stock 19 by a transverse cut made at the point 21 represented in FIG. 5, to form one of the inserts 10. The internal threads 15 within the insert may be formed either before or after the cut is made at the point 21. Also, there should be formed at the opposite ends of the insert two frustro-conical chamfers 22 and 23, which may in some cases be identical, or may be slightly different as shown to serve somewhat different purposes at the axially inner and outer ends of the insert. In the particular construction illustrated in the drawing, the axially inner chamfer 22 is relatively large, to facilitate initial insertion of the insert into part 12, while chamfer 23 is smaller, to leave a transverse annular surface 24 at the axially outer end of the insert for engagement by a tool to be used in screwing the insert into bore 11.

All of the above discussed operations may if desired be performed on a screw machine, so that the machine may function very rapidly to successively produce a series of inserts 10 from the single length of bar stock 19. In many instances, however, it is felt preferable to perform all of these operations except the application of internal threads 15 on the screw machine, and then leave this internal threading operation for a subsequent step in a different machine. In this case, the external hexagonal configuration of the insert has proven extremely helpful, since such a hexagonal part can be easily inserted into and held effectively by a correspondingly shaped hexagonal tool chuck during the final internal threading operation.

The external threads 14 on insert 10 extend along the entire length of the insert, and may be conventional screw threads insofar as they are truncated by virtue of the initial polygonal shape of the bar stock. To consider somewhat more specifically the shape of threads 14, disregarding for the moment the alteration in their shape resulting from the polygonal cross-section of the stock, threads 14 have a uniform major diameter represented at 25 in FIG. 2. Also, these threads have a uniform minor diameter 26, which is desirably somewhat modified as shown, to assure the provision of a maximum possible wall thickness in the insert. That is, between successive turns of the external threads 14, part 10 has a short cylindrical helically advancing surface 27.

In the optimum arrangement, the threads 14 may be so formed with relation to the dimensions of polygonal stock 19 that the minimum diameter portions 27 of threads 14 are spaced a short distance radially inwardly of the planes of the flat sides 28 of the polygonal stock at the central portions 29 (see FIG. 3) of those flat sides. Stated differently, the radius "$r$" of the minimum diameter portions 27 of the threads 14 may be somewhat less than the radial distance of each flat side 28 from axis 16 at the central portion 29 of that side. Also, the radial distance "$d$" between axis 16 and the corners or edges 30 of the polygonal stock 19 may be substantially equal to the radius of the major diameter portions 25 of the threads.

As a result of this manner of formation of insert 10, each of the individual turns of threads 14 forms a series of circularly spaced projections (see FIG. 3), which extend radially outwardly to the maximum diameter of the threads at a series of points 30. Between these projections, the flat sides 28 of the initial bar stock 19 truncate the threads to form planar outer surfaces of the type represented at 28a in FIGS. 1, 2 and 5. Each of these chord-like planar surfaces 28a, in extending from one of the projection points 30 to the next, first advances progressively radially inwardly to the intermediate point 29, and then advances progressively radially outwardly to the next projection location.

In using the insert represented at 10, a person merely screws the insert into the initially unthreaded bore 11, to form threads 31 in that bore, and to ultimately advance the insert 10 to the completely installed position of FIG. 2. Preferably, the cylindrical bore 11 initially provided in part 12 is of a diameter somewhat greater than the minimum diameter 26 of threads 14 on the insert. For example, the diameter of bore 11 may originally be that represented at "$b$" in FIG. 2. As insert 10 is screwed into the bore, the projections 30 on the insert act to progressively form threads 31 in the bore by a cold working operation, but do not perform a cutting operation, and therefore do not leave any cuttings on or in the parts. More specifically, the projections 30 of the threads force their way through the material of part 12, to form thread grooves corresponding approximately to the shape of threads 14, and the material displaced in forming these grooves is forced into the inter-thread spaces, to actually decrease the diameter of the bore 11 at those inter-thread locations to the minimum diameter 26 of the threads. As each of the projections 30 advances through the material of part 12, one of the planar surfaces 28a at all times leads that projection 30, that is, moves through the material ahead of that projection, with the result that the surface 28a progressively cams or wedges the material radially outwardly toward the diameter of projection 30. In this way, the thread forming action is performed very smoothly, and in a wedging manner, to eliminate any possibility of actual cutting of the material of part 12, and to thus assure the formation of extremely strong threads as a result of the actual cold working operation.

After one of the projections 30 has moved circularly beyond a particular portion of the material of part 12, the inherent slight resilience of the metal or other material 12 will cause that material to return very slightly radially inwardly at a location circularly behind the projection. As a result, the peak portion of each of the projections 30 extends outwardly into the material of part 12 a slight distance radially beyond the rest of the thread groove. This is represented in FIG. 3, in which it is apparent that each of the projections 30 at its peak is embedded slightly within the material of part 12. This feature gives to the insert 10 a very effective self-locking action, since in order to unscrew the insert from its FIG. 3 position each of the projections 30 must move in a counter-clockwise direction, and yet in order to do so it must wedge some of the material directly ahead of it radially outwardly. Further, in attempting to turn the insert in a counter-clockwise direction in this manner, there is apparently a tendency for each of the projections 30 to accumulate a slight amount of the material of part 12 ahead of it, to further increase the resistance to an unscrewing motion. At any rate, it has definitely been proven that the inert represented in FIGS. 1 to 5 does have a very definite and very effective locking action, eliminating the necessity for the provision of any locking keys for securing it in the FIG. 2 position.

FIG. 4 represents the manner in which a leading one of the projections at locations 30 functions to deform the material of the part 12 during the thread forming operation. As is brought out clearly in this figure, the surface 28a is camming the material of part 12 radially outwardly toward the diameter of the peak 30. Also, the material of part 12 is returning to a slightly decreased diameter at 32 directly behind peak 30.

FIGS. 6 through 8 represent a slightly variational form of the invention, which is formed the same as that of FIGS. 1 through 5 except that the initial bar stock 33 is twisted before the individual inserts 34 are formed therefrom. The twisting operation may be performed as represented in FIG. 8, in which there is shown at 33 an elongated strip of bar stock which initially was of the straight polygonal cross-sectional configuration discussed in connection with stock 19 of the first form of the invention. This piece of the bar stock 33 may be positioned within an elongated rigid tube 35 of a diameter only slightly larger than the size of stock 33, and with a first end of stock 33 being rigidly held in fixed position by a stationary chuck 36. The opposite end of bar stock 33 may be gripped by a second chuck 37, aligned with the first chuck, and this second chuck 37 may then be forcibly turned about the axis of the two chucks and about the axis of part 33, and through a sufficient angle to give part 33 a permanent twist of a predetermined helical pitch.

This twist may, for example, correspond to a twist of between about 2 and 6 turns per foot, but depends on the bar size to a great extent.

After stock 33 has been given a permanent twist in this manner, and is in the condition represented in the upper portion of FIG. 6, this stock may then be placed in a screw machine, and may be threaded externally and internally, chamfered, and cut off in short lengths, in exactly the same manner discussed in connection with FIGS. 1 through 5. The ultimate insert 34 produced in this manner will then be substantially the same as the insert represented at 10, except that the projections or peaks 38 formed by each turn of the external thread 39 will be offset circularly a short distance with respect to the corresponding projections 38a formed by the next successive turn. Since the projections 38 and 38a of the various turns are in this way all offset circularly from one another, the insert of FIGS. 6 and 7 has a considerably greater resistance to being pulled directly axially outwardly from within a part into which it has been screwed, than does the insert of FIGS. 1 through 5. That is, in order to pull the insert of FIGS. 6 and 7 directly outwardly from within a part 12, it would be necessary for all of the projections 38 and 38a to tear their way outwardly through different portions of the material of part 12.

The self-tapping action of threads 39 in FIGS. 6 and 7 is of course substantially identical with the action attained in FIGS. 1 through 5. Similarly, the self-locking action of the second form of the invention is the same as in the first form.

This is a divisional application of Serial No. 806,371 filed April 14, 1959 and now abandoned.

I claim:

1. The method of forming a series of internally and externally threaded self tapping inserts which are adapted to tap threads in an unthreaded bore; said method comprising providing an elongated piece of stock having a predetermined non-circular external cross-section throughout an extended length thereof which is many times the length of said individual inserts to be formed, said cross-section being such that the non-circular stock presents a series of circularly successive sides extending along the length of the stock and forming radially outwardly projecting peaks at the junctures of said sides also extending along the length of the stock; forming external threads on said non-circular stock centered about a predetermined longitudinal axis of the stock, with the threads being of maximum radial thickness at said peaks and being truncated progressively by said sides so that, as a particular thread extends circularly from one peak to the next, the thread first decreases progressively in radial thickness and then increases in radial thickness; forming modified minor diameter surfaces between successive turns of said external threads which extend substantially directly axially at a predetermined substantially uniform diameter; and at some time during said method performing the additional steps of cutting off successive portions of said non-circular stock to form a series of said threaded inserts from said successive portions, with said external threads extending along substantially the entire length of each insert; forming tapering chamfer surfaces of circular cross-section centered about said axis at both ends of each insert with said chamfer surfaces progressively truncating said peaked external threads at both ends of the insert and to an extent greater than that to which the external threads are truncated by said sides intermediate said ends, and forming internal threads within each insert and within said peaked truncated external threads and centered about said axis, said internal threads extending along the major portion of the length of said insert and being open for access from both ends of the insert.

2. The method of forming a series of internally and externally threaded self tapping inserts which are adapted to tap threads in an unthreaded bore; said method comprising providing an elongated piece of stock having a predetermined non-circular external cross-section throughout an extended length thereof which is many times the length of said individual inserts to be formed; said cross-section being such that the non-circular stock presents a series of six essentially identical circularly successive sides extending along the length of the stock and forming six essentially identical radially outwardly projecting peaks at the junctures of said sides also extending along the length of the stock; forming external threads on said non-circular stock centered about a predetermined longitudinal axis of the stock, with the threads being of maximum radial thickness at said peaks and being truncated progressively by said sides so that, as a particular thread extends circularly from one peak to the next, the thread first decreases progressively in radial thickness and then increases in radial thickness; forming modified minor diameter surfaces between successive turns of said external threads which extend substantially directly axially at a predetermined substantially uniform diameter; and at some time during said method performing the additional steps of cutting off successive portions of said non-circular stock to form a series of said threaded inserts from said successive portions, with said external threads extending along substantially the entire length of each insert; forming tapering chamfer surfaces of circular cross-section centered about said axis at both ends of each insert with said chamfer surfaces progressively truncating said peaked external threads at both ends of the insert and to an extent greater than that to which the external threads are truncated by said sides intermediate said ends, and forming internal threads within each insert and within said peaked truncated external threads and centered about said axis, said internal threads extending along the major portion of the length of said insert and being open for access from both ends of the insert.

3. The method of forming a series of internally and externally threaded self tapping inserts which are adapted to tap threads in an unthreaded bore; said method comprising providing an elongated piece of stock having a predetermined non-circular external cross-section throughout an extended length thereof which is many times the length of said individual inserts to be formed; said cross-section being such that the non-circular stock presents a series of circularly successive sides extending along the length of the stock and forming radially outwardly projecting peaks at the junctures of said sides also extending along the length of the stock; forming external threads on said non-circular stock centered about a predetermined longitudinal axis of the stock, with the threads being of maximum radial thickness at said peaks and being truncated progressively by said sides so that, as a particular thread extends circularly from one peak to the next, the thread first decreases progressively in radial thickness and then increases in radial thickness; twisting said non-circular stock before formation of said external threads thereon and to a condition in which said peaks essentially spiral about the stock and longitudinally thereof; and at some time during said method performing the additional steps of cutting off successive portions of said non-circular stock to form a series of said threaded inserts from said successive portions, with said external threads extending along substantially the entire length of each insert; forming tapering chamfer surfaces of circular cross section centered about said axis at both ends of each insert with said chamfer surfaces progressively truncating said peaked external threads at both ends of the insert, to an extent greater than that to which the external threads are truncated by said sides intermediate said ends; and forming internal threads within each insert and within said peaked truncated external threads and centered about said axis, said internal threads extending along the major portion of the length of said insert and being open for access from both ends of the insert.

References Cited in the file of this patent

UNITED STATES PATENTS

| | | |
|---|---|---|
| 180,285 | Sutter | July 25, 1876 |
| 586,232 | English | July 13, 1897 |
| 986,697 | Deeds | Mar. 14, 1911 |
| 1,386,106 | Halbritter | Aug. 2, 1921 |
| 1,428,792 | Lysiak | Sept. 12, 1922 |
| 1,875,362 | Wells | Sept. 6, 1932 |
| 2,056,053 | Moore | Sept. 29, 1936 |
| 2,247,499 | Hutchison | July 1, 1941 |
| 2,302,621 | Luboshez | Nov. 17, 1942 |
| 2,352,982 | Tomalis | July 4, 1944 |
| 2,820,972 | Ptak | Jan. 28, 1958 |
| 2,823,574 | Rosan | Feb. 18, 1958 |

FOREIGN PATENTS

| | | |
|---|---|---|
| 12,651 | Great Britain | Oct. 22, 1885 |